United States Patent
Lee et al.

(10) Patent No.: US 8,942,427 B2
(45) Date of Patent: Jan. 27, 2015

(54) METHOD AND AN APPARATUS FOR DISPLAYING A 3-DIMENSIONAL IMAGE

(75) Inventors: Dongha Lee, Seoul (KR); Taesoo Park, Seoul (KR); Dongman Jeong, Seoul (KR); Kyoungll Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 61 days.

(21) Appl. No.: 13/190,211

(22) Filed: Jul. 25, 2011

(65) Prior Publication Data

US 2012/0027257 A1 Feb. 2, 2012

(30) Foreign Application Priority Data

Jul. 29, 2010 (KR) ........................ 10-2010-0073473

(51) Int. Cl.
- *G06K 9/00* (2006.01)
- *H04N 13/04* (2006.01)
- *H04N 13/00* (2006.01)

(52) U.S. Cl.
CPC ....... *H04N 13/0475* (2013.01); *H04N 13/0422* (2013.01); *H04N 13/0007* (2013.01); *H04N 13/0404* (2013.01); *H04N 13/0409* (2013.01)
USPC ........... 382/106; 345/419; 345/440; 345/522; 345/55; 348/51; 348/59; 359/462; 359/464; 359/465; 359/630; 382/195; 382/199

(58) Field of Classification Search
None
See application file for complete search history.

(56) References Cited

U.S. PATENT DOCUMENTS

| | | | | |
|---|---|---|---|---|
| 5,349,379 A | * | 9/1994 | Eichenlaub | 348/59 |
| 5,712,732 A | * | 1/1998 | Street | 359/630 |
| 5,832,115 A | * | 11/1998 | Rosenberg | 382/199 |
| 5,877,774 A | * | 3/1999 | Saito | 345/440 |
| 5,936,774 A | * | 8/1999 | Street | 359/630 |
| 5,991,073 A | * | 11/1999 | Woodgate et al. | 359/462 |
| 7,190,518 B1 | * | 3/2007 | Kleinberger et al. | 359/465 |
| 7,224,526 B2 | * | 5/2007 | Putilin et al. | 359/462 |
| 2004/0227992 A1 | * | 11/2004 | Putilin et al. | 359/462 |
| 2005/0264651 A1 | * | 12/2005 | Saishu et al. | 348/51 |
| 2007/0019936 A1 | * | 1/2007 | Birkenbach et al. | 396/14 |
| 2007/0286490 A1 | * | 12/2007 | Danowitz | 382/195 |
| 2009/0073087 A1 | * | 3/2009 | Janson et al. | 345/55 |
| 2010/0046615 A1 | | 2/2010 | Chen et al. | |
| 2011/0051239 A1 | * | 3/2011 | Daiku | 359/464 |
| 2011/0234605 A1 | * | 9/2011 | Smith et al. | 345/522 |
| 2013/0050197 A1 | * | 2/2013 | Oosawa | 345/419 |

OTHER PUBLICATIONS

Chinese Office Action dated Sep. 3, 2013 for Application 201110278772.8 and English language translation.
European Search Report for Application 11006133.0 dated Dec. 20, 2013.

* cited by examiner

*Primary Examiner* — Tsung-Yin Tsai
(74) *Attorney, Agent, or Firm* — KED & Associates LLP

(57) ABSTRACT

A three-dimensional (3D) image display device may display a perceived 3D image. A location tracking unit may determine a viewing distance from a screen to a viewer. An image processing unit may calculate a 3D image pixel period based on the determined viewing distance, may determine a color of at least one of pixels and sub-pixels displaying the 3D image based on the calculated 3D image pixel period, and may control the 3D image to be displayed based on the determined color.

21 Claims, 14 Drawing Sheets

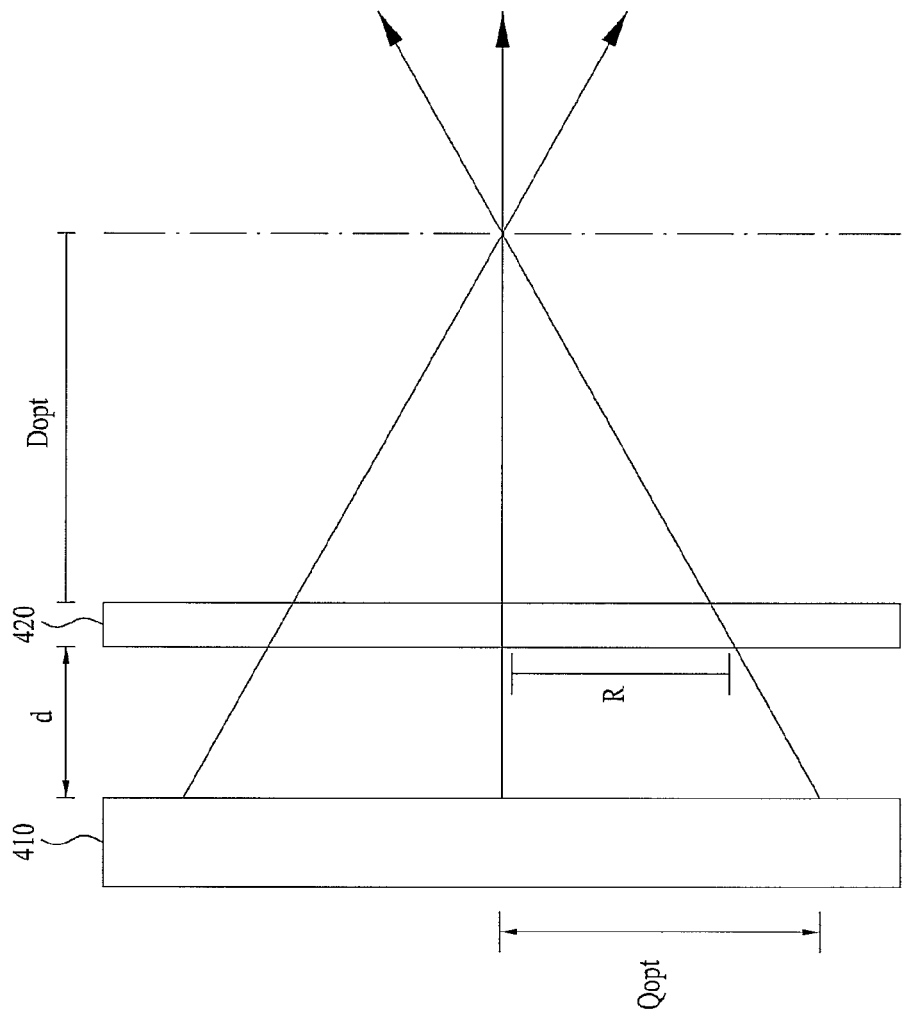

METHOD AND AN APPARATUS FOR DISPLAYING A 3-DIMENSIONAL IMAGE

CROSS-REFERENCE TO RELATED APPLICATION

This application claims priority under 35 U.S.C. §119 from Korean Application No. 10-2010-0073473, filed Jul. 29, 2010, the subject matter of which is incorporated herein by reference.

BACKGROUND

1. Field

Embodiments may relate to displaying a three-dimensional image.

2. Background

Display technology to display 3-dimensional (3D) images has been studied and utilized. Electronic devices capable of displaying 3D images, using 3D image displaying technology, attract public attention.

3D image displaying technology may use a principle of a time difference in both human eyes that may provide a viewer a stereoscopic and cubic effect. The 3D image displaying technology may be categorized as a shutter glass method, a non-glass method, and/or a complete-3D method. The shutter glass method may have a disadvantage that a user has to wear auxiliary polarizing glasses. The non-glass method may have a disadvantage that a user has to view 3D images only at a specific location. The shutter glass method and non-glass method have such disadvantages.

BRIEF DESCRIPTION OF THE DRAWINGS

Arrangements and embodiments may be described in detail with reference to the following drawings in which like reference numerals refer to like elements and wherein:

FIGS. 4A to 4C are diagrams illustrating a stereoscopic image pixel period required according to a viewing distance;

DETAILED DESCRIPTION

Reference may be made in detail to specific embodiments, examples of which may be illustrated in the accompanying drawings. Wherever possible, same reference numbers may be used throughout the drawings to refer to the same or like parts.

Although terms may be selected from generally known and used terms, some of the terms mentioned in the description may have been selected by the applicant at his or her discretion, the detailed meanings of which may be described in relevant parts of the description herein. Further, embodiments may be understood, not simply by the actual terms used but by the meanings of each term lying within.

As used hereinafter, a three-dimensional (3D) image may be considered a perceived or apparent 3D image and/or a stereoscopic image.

Figure 1:
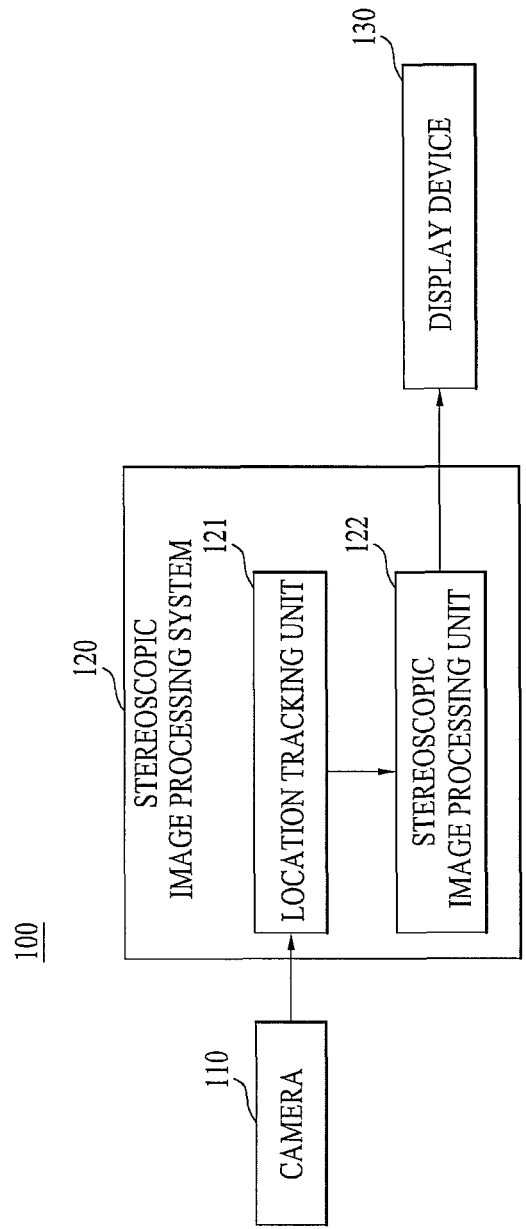
FIG. 1 is a block diagram of a stereoscopic display system according to an exemplary embodiment.

FIG. 1 is a block diagram of a stereoscopic display system according to an exemplary embodiment. Other embodiments and configurations may also be provided FIG. 1 shows a stereoscopic image display system 100 (or image display system) that includes a camera 110, a stereoscopic image processing system 120 (or image processing system) and a display device 130. The image display system 100 may be a personal computer system such as a desktop, a laptop, a tablet and/or a handheld computer. The image display system 100 may be a mobile terminal such as a cell phone, smart phone, a digital broadcasting terminal, a Personal Digital Assistant (PDA), a Portable Multimedia Player (PMP), navigation and/or the like or a fixed-type electric appliance such as a digital TV and/or the like.

The camera 110 may photograph an image of a viewer (or user). The camera 110 may have a variety of hertz (Hz) and it may output an image frame having the viewer photographed therein to the stereoscopic image processing system 120 (or image processing system) based on a preset or given Hz. When the camera 110 is preset to have '25 Hz', the camera 110 may photograph 25 image frames per second and the camera 110 may output the photographed image frames to the image processing system 120.

The image processing system 120 may recognize (or determine) a viewing distance based on the image frames outputted from the camera 110, and the image processing system 120 may control a stereoscopic image to be displayed based on the recognized viewing distance (or determined viewing distance). The image processing system 120 may include a location tracking unit 121 and a stereoscopic image processing unit 122. The image processing system 120 may be embodied as single product, such as a set-top box.

The location tracking unit 121 may receive the image frames of the photographed viewer from the camera 110. The location tracking unit 121 may detect a location of the viewer based on the received image frames. After that, the location tracking unit 121 may compute the amount of stereoscopic image variation based on the detected location of the viewer. The location tracking unit 121 may recognize the viewing distance in comparison between the detected location of the viewer and a location of a viewer detected based on a former image frame or a reference image frame.

The location tracking unit 121 may be a single module, or a modulated location tracking unit may be provided in the stereoscopic image processing unit 122 to be a single product. The image processing system 120 may implement a program to perform a function of the location tracking unit 121 via a controller, and/or to perform the function of the location tracking unit 121.

The image processing unit 122 may compute a stereoscopic pixel period based on the viewing distance recognized (or determined) by the location tracking unit 121, and the stereoscopic image processing unit 122 may determine a color of at least one of pixels and sub-pixels that display the stereoscopic image. The stereoscopic image processing unit 122 may adjust a location at which the determined color will be displayed, based on the amount of the stereoscopic image variation that is computed by the location tracking unit 121. The stereoscopic image processing unit 122 may be a broadcasting receiver to encode a received stereoscopic image signal or a stored stereoscopic image file. The broadcasting receiver may receive broadcasting contents transmitted via a terrestrial, satellite and cable and/or broadcasting contents transmitted via an internet.

The broadcasting receiver may provide a viewer with an internet service. The internet service may be a service provided via the internet, for example, an information service such as a Content's on Demand (COD) service, a YouTube service, an information service for weather, news, community information and search, an entertainment service for a game and/or karaoke, and a communication service for TV mail and TV Short Message Service (SMS). The digital broadcasting receiver may include a network TV, a web TV and/or a broadband TV.

The broadcasting receiver may be a smart TV capable of receiving an application from a server and capable of installing and implementing the received application.

The broadcasting service received by the stereoscopic image processing unit 122 may include an internet service as well as the broadcasting service provided via a terrestrial, satellite and/or cable. The broadcasting service may provide not only 2-dimensional images but also stereoscopic images. The stereoscopic image may be a multiview image. The multiview image may be a plurality of images obtained by photographs of plural cameras with respect to a single subject, and the image obtained by each of the cameras may be defined as a view image.

The display device 130 may display a stereoscopic image based on control of the image processing system 120. The display device 130 may be a 2 view (or more) barrier type non-glass 3D display or a lenticular type non-glass 3D display. The display device 130 may be an independent product or may be integrally formed with the image processing system 120 or the stereoscopic image processing unit 122. Alternatively, the display device 130 may be a non-glass 3D display having a sub-pixel unit or a pixel unit view-point-format.

Figure 2:
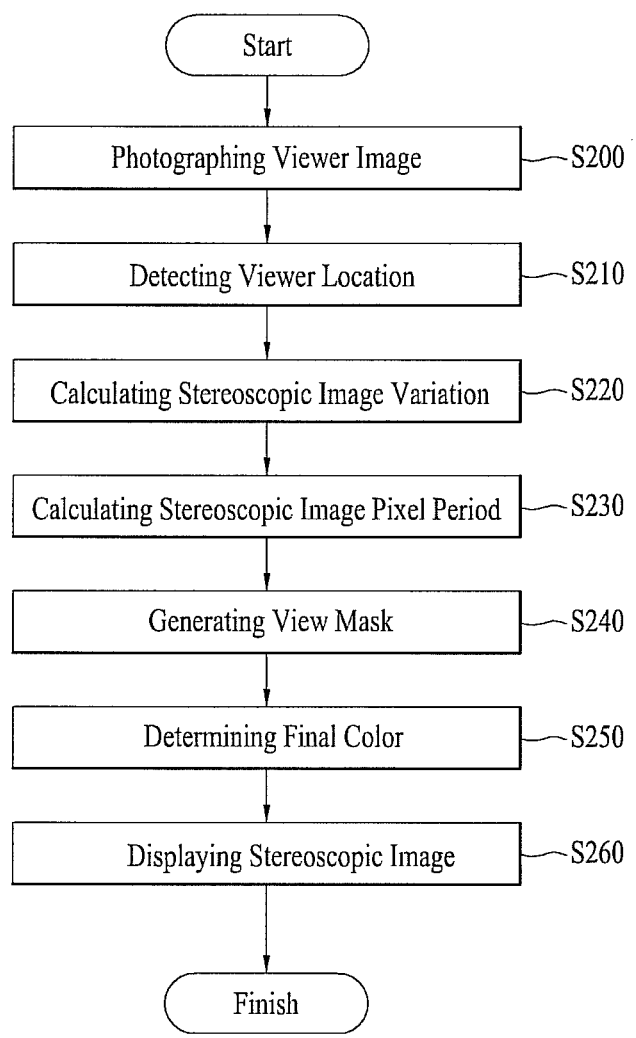
FIG. 2 is a flow chart illustrating a method for displaying a stereoscopic image according to an exemplary embodiment.

FIG. 2 is a flow chart illustrating a method for displaying a stereoscopic image according to an exemplary embodiment. Other operations, orders of operations and embodiments may also be provided.

As shown in FIG. 2, the camera 110 photographs an image of the viewer (S200). The camera 110 may photograph the image of the viewer based on a preset or given Hz, and the camera 110 may output the photographed images to the image processing system 120 continuously in real-time, for example. The camera 110 may be a depth camera. The depth camera may obtain (or acquire) a light reflected against a laser or infrared ray light after being shone to a subject, and the depth camera may obtain (or acquire) a depth image for the subject. The depth may be a distance from the depth camera to the subject (or viewer).

The image processing system 120 may detect the location of the viewer based on image frames included in the image photographed by the camera 110 (S210). The image processing system 120 may recognize (or determine) a viewing distance of the viewer based on the detected location of the viewer. The image processing system 120 may recognize (or determine) the viewing distance based on a ratio of the viewer to the image frame and the location of the viewer on a 2-dimensional plane. The image processing system 120 may compare the detected location of the viewer with a location of the viewer detected from a former image frame or from a reference image frame, to recognize (or determine) the viewing distance. The image processing system 120 may receive a depth value from the camera 110 or may acquire a depth value from the depth image photographed by the camera 110, such that the image processing system 120 may recognize (or determine) the viewing distance based on the depth value.

The image processing system 120 may compute the amount of the stereoscopic image variation based on the detected viewer location (S220). The amount of the stereoscopic image variation may be an amount of moved pixels or moved sub-pixels.

The image processing system 120 may compute the stereoscopic image pixel period based on the recognized viewing distance (S230).

The image processing system 120 may generate a view mask for the stereoscopic image based on the computed stereoscopic pixel period (S240).

The image processing system 120 may determine a final color of the pixel or a final color of the sub-pixel based on a color of a pixel or a sub-pixel of each view image included in the stereoscopic image and the generated view mask (S250).

The image processing system 120 may control the display device 130 to display the stereoscopic image based on the determined final color (S260). The image processing system 120 may adjust a location of the determined final color, which may be displayed, based on the computed amount of the stereoscopic images. In other words, the display device 130 may move the pixel location, at which the pixel color forming the stereoscopic image may be displayed, from an original location based on the computed stereoscopic-image-variation-amount. The display device 130 may move the sub-pixel location, at which the sub-pixel color forming the stereoscopic image may be displayed, from an original location based on the computed stereoscopic-image-variation-amount.

Figure 3A:
FIGS. 3A to 3C illustrate image frames of a viewer photographed by a stereoscopic display system.
Figure 3B:
Figure 3C:

FIGS. 3A to 3C illustrate image frames of a viewer photographed by the stereoscopic display system.

With reference to FIGS. 3A to 3C, the image processing system 120 may detect a location 311 of the viewer by using an image frame 310. The image processing system 120 may recognize (or determine) a face area from the image frame 310, and the image processing system 120 may detect (or determine) the location 311 of the viewer. The image processing system 120 may recognize (or determine) a face area based on an algorithm using face symmetry, an algorithm using a hair color or face color and/or an algorithm using a face line. The image processing system 120 may determine (or compute) skin color information from the image frame 310, and the image processing system 120 may recognize (or determine) the face area.

The image processing system 120 may recognize (or determine) a viewing distance based on the detected location 311 of the viewer. For example, the image processing system 120 may compute the viewing distance based on an image ratio and an image location of the viewer in an image frame. Alternatively, the image processing system 120 may acquire (or determine) a depth value of the face area from a depth image, and the image processing system 120 may compute the viewing distance based on the acquired depth value.

The image processing system 120 may compare a reference image frame with a current image frame, in order to compute the viewing distance. For example, the image processing system 120 may compare a ratio of the viewer from the reference image frame with a ratio of the viewer from the current image frame, such that the image processing system 120 may compute the viewing distance based on a difference between the image ratios. That is, when the image ratios are identical, the viewing distance of the reference image frame may be recognized as the viewing distance of the current image frame.

Alternatively, the image processing system 120 may compare the viewer image size of the reference image frame with the viewer image size of the current image frame, in order to compute the viewing distance. When the current image frame is the image frame 310 in case the reference image frame is the image frame 310, the size of an image 311 is identical to the image size of the reference image frame. Accordingly, the image processing system 120 may recognize (or determine) the viewing distance of the reference image frame as the current viewing distance. When the current image frame is an image frame 320, the size of an image is smaller than the image size of the reference image frame. Accordingly, the image processing system 120 may recognize (or determine) that the current viewing distance is larger than the viewing distance of the reference image frame, and the image processing system 120 may compute the current viewing distance from the viewing distance of the reference image frame based on the size ratio of the images. When the current image frame is an image frame 330, the size of an image 331 is larger than the image size of the reference image frame. Accordingly, the image processing system 120 may recognize (or determine) that the current viewing distance is less than the viewing distance of the reference image frame, and the image processing system 120 may compute the current viewing distance from the viewing distance of the reference image frame based on the size ratio of the images.

Alternatively, the image processing system 120 may compare a current image frame with a former image frame, in order to compute the viewing distance. The comparing method may use the identical comparing method with respect to the reference image frame.

Figure 4B:
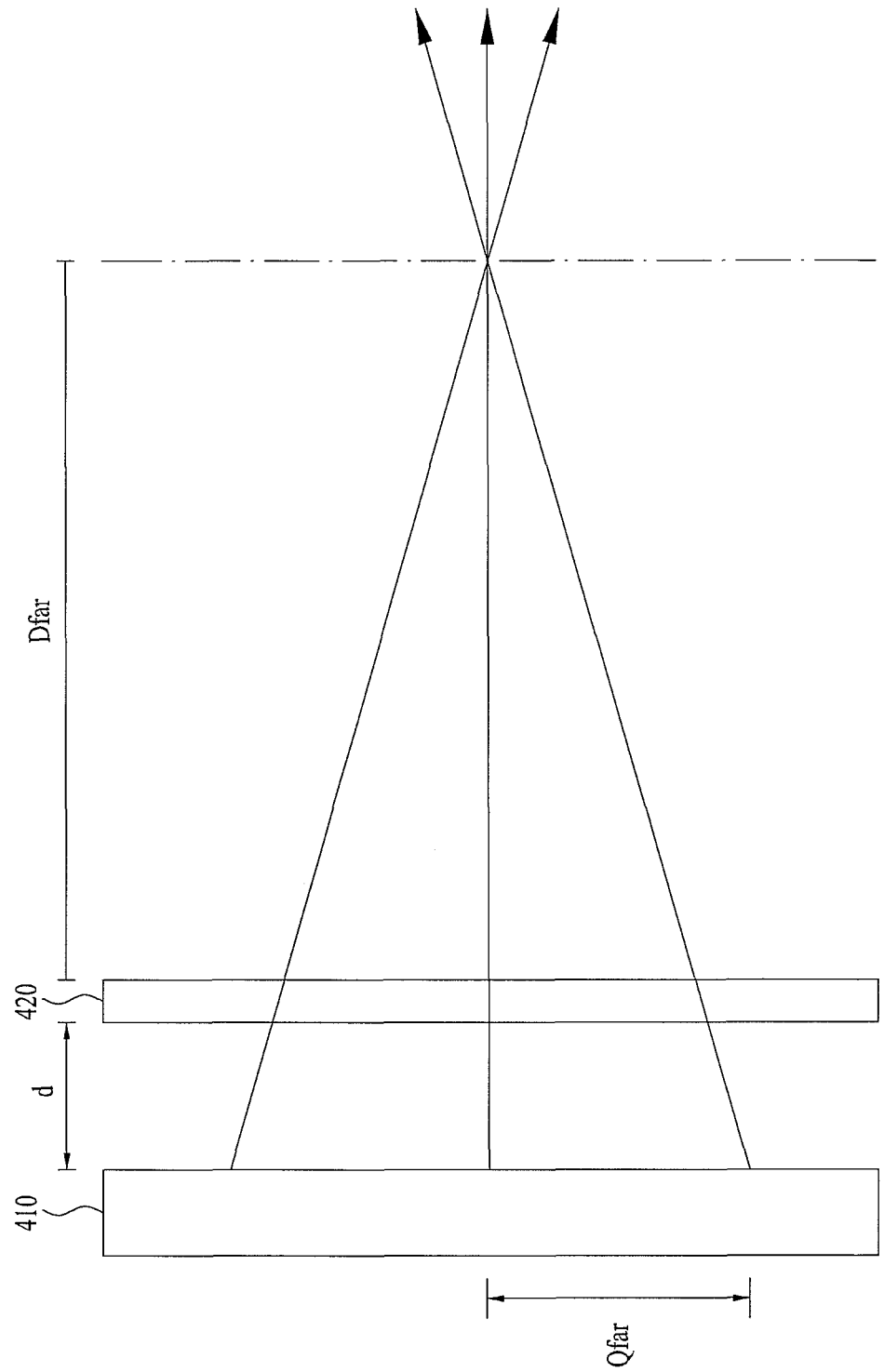
Figure 4C:
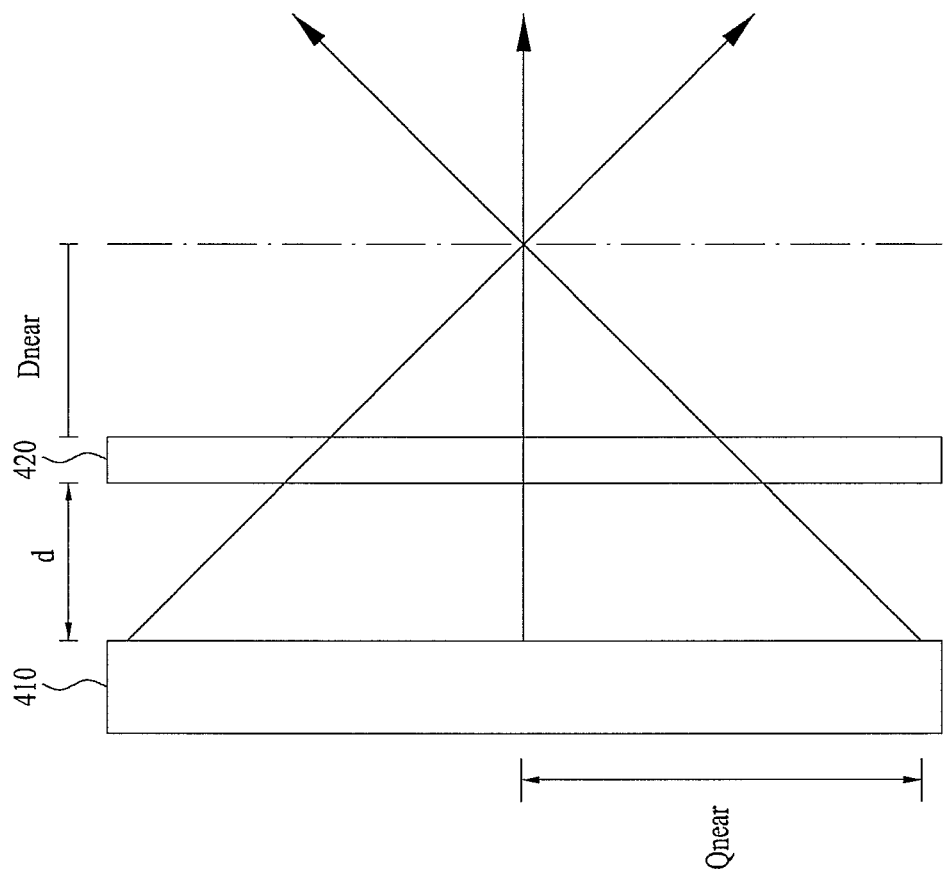

FIGS. 4A to 4C are diagrams illustrating a stereoscopic image pixel period required according to a viewing distance.

With reference to FIGS. 4A to 4C, the image processing system 120 may compute a stereoscopic image pixel period 'Q' based on the following EQUATION:

$$Q=(D+d)*R/D \quad \text{[EQUATION 1]}$$

In EQUATION 1, 'D' is the viewing distance, 'd' is a distance between a display panel 410 and a stereoscopic image filter 420, and 'R' is a pattern period of the stereoscopic image filter 420.

As shown in FIG. 4A, when the viewing distance 'D' is a reference viewing distance 'Dopt', the stereoscopic pixel period 'Q' may be a reference stereoscopic image pixel period 'Qopt'. The reference stereoscopic image pixel period 'Qopt' may be an initial stereoscopic image pixel period. As shown in FIG. 4B, when it is recognized (or determined) that the viewing distance is a viewing distance 'Dfar' that is greater than the reference viewing distance 'Dopt', the stereoscopic image pixel period 'Q' is a viewing distance 'Qfar' that is less than the reference stereoscopic image pixel period 'Qopt'. As shown in FIG. 4C, when it is recognized (or determined) that the viewing distance is a viewing distance 'Dnear' that is less than the reference viewing distance 'Dopt', the stereoscopic image pixel period is a stereoscopic image pixel period 'Qnear' that is greater than the reference stereoscopic image pixel period 'Qopt'.

Figure 5A:
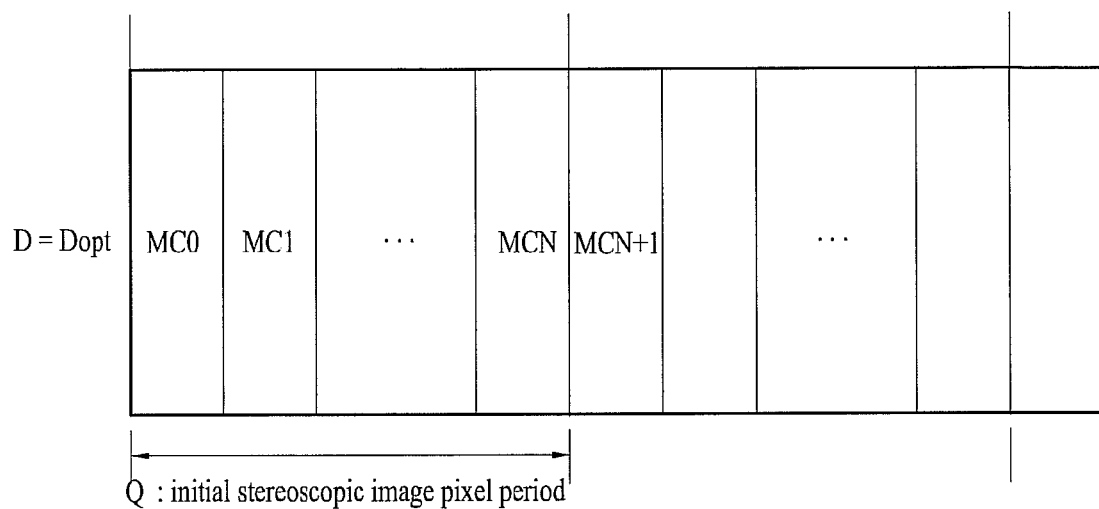
FIGS. 5A to 5C are diagrams illustrating a pixel period that changes based on a viewing distance.
Figure 5B:
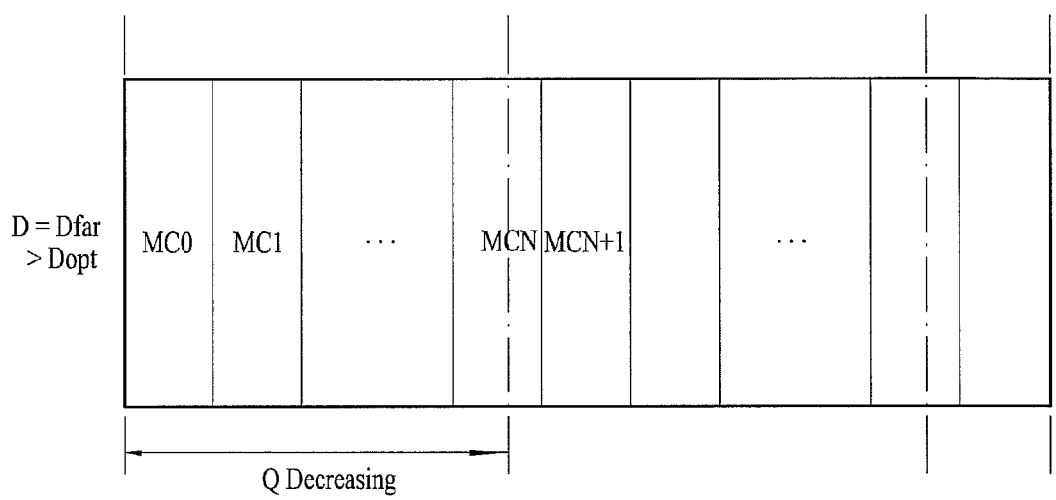
Figure 5C:
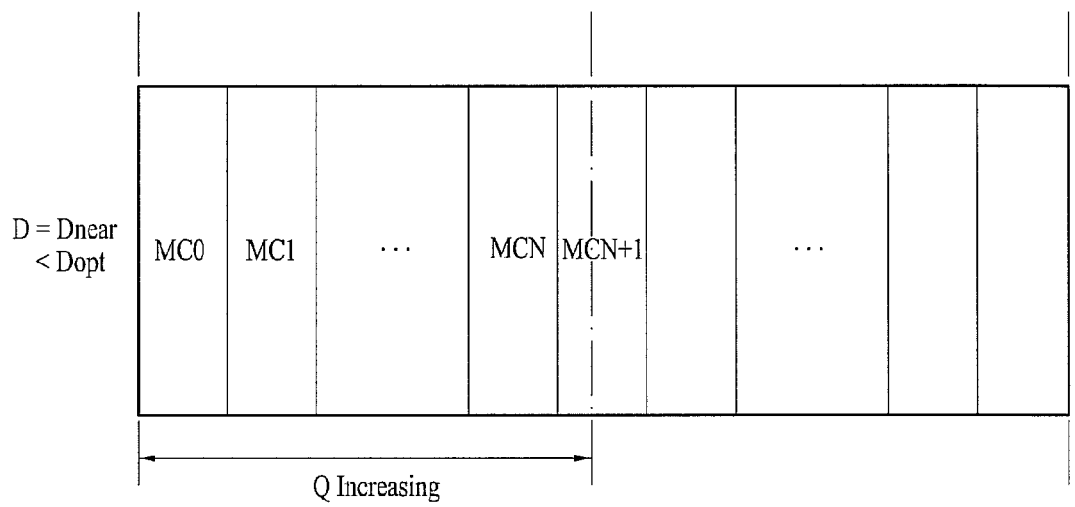

FIGS. 5A to 5C are diagrams illustrating a stereoscopic image pixel period that changes based on a viewing distance.

With reference to FIGS. 5A to 5C, the image processing system 120 may determine a view number 'Vi' that includes a decimal point of each sub-pixel according to the stereoscopic image pixel period 'Q' based on the following 'EQUATION 2':

$$V_i = \text{Mod}(V_i^0 * Q^0/Q, N) \quad \text{[EQUATION 2]}$$

In EQUATION 2, 'i' is a sub-pixel horizontal number (0, 1, 2 ...), '$V_i^0$' is a sub-pixel view number at an optimal viewing distance and '$Q^0$' is a stereoscopic image pixel period at the optimal viewing distance, and 'N' is the stereoscopic image view number. The optimal viewing distance may be a viewing distance 'Dopt' of FIGS. 5A to 5C.

The image processing system 120 may compute a mask 'α' at each viewpoint corresponding to the sub-pixel view number based on the following 'EQUATION 3':

$$\alpha(i,k) = W(k-V_i) \quad \text{[EQUATION 3]}$$

Figure 8:
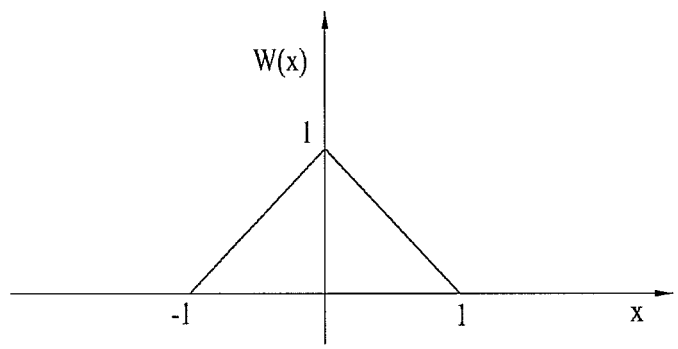
FIG. 8 is a graph of a Function W(x).

In EQUATION 3, 'k' is the view number and a graph the function 'W (k−Vi)' is shown in FIG. 8.

The image processing system 120 may compute a final color 'MCi' of the sub-pixel based on the computed view mask 'a' from the following 'EQUATION 4':

$$MC_i = \sum_{k=0}^{N-1} \alpha(i,k) * C(i,k) \quad \text{[EQUATION 4]}$$

In EQUATION 4, 'C (I, k)' is a color of T sub-pixel at 'k' view.

As shown in FIG. 5A, when the recognized (or determined) viewing distance 'D' is the optimal viewing distance 'Dopt', the image processing system 120 may determine the final color 'MC 0, MC 1, ..., MC N, MC N+1 of the sub-pixel to allow the stereoscopic image pixel period 'Q' to be maintained as a pixel period '$Q^0$' at the optimal viewing distance.

As shown in FIG. 5B, when the recognized (or determined) viewing distance 'Dfar' is greater than the optimal viewing distance 'Dopt', the image processing system 120 may determine the final color MC 0, MC 1, ..., MC N, MC N+1 of the sub-pixel to allow the stereoscopic image pixel period 'Q' to be 'Qfar', which is less than '$Q^0$', of the pixel period at the optimal viewing distance 'Dopt'. The stereoscopic image pixel period may be decreased to be less than the pixel period '$Q^0$' by the determined final color of the pixel period MC 0, MC 1, ..., MC N, MC N+1.

As shown in FIG. 5C, when the recognized (or determined) viewing distance 'D' is 'Dnear', which is less than the optimal viewing distance 'Dopt', the image processing system 120 may determine the final color MC 0, MC 1, ..., MC N, MC N+1 of the sub-pixel to allow the stereoscopic image pixel period 'Q' to be 'Qnear', which is greater than '$Q^0$' of the pixel period at the optimal viewing distance 'Dopt'. The stereoscopic image pixel period may be increased to be more than the pixel period '$Q^0$' by the determined final color of the pixel period MC 0, MC 1, ..., MC N, MC N+1.

Figure 6:
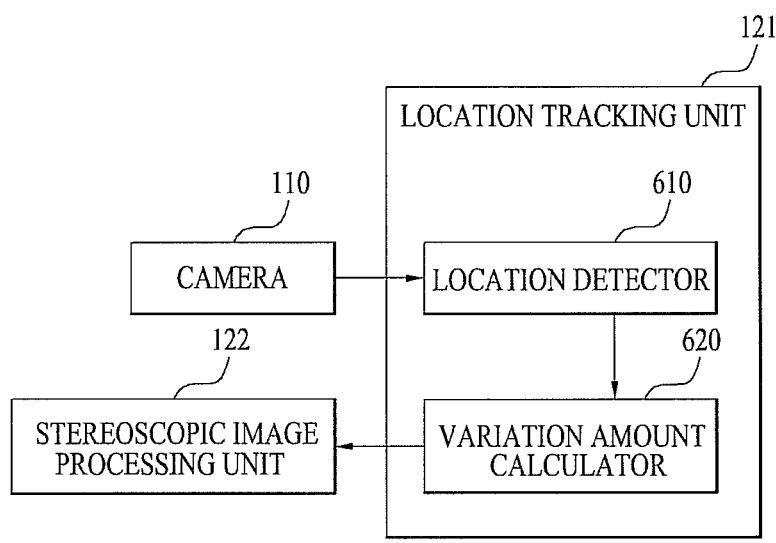
FIG. 6 is a block diagram of a location tracking unit according to an exemplary embodiment.

FIG. 6 is a block diagram of a location tracking unit according to an exemplary embodiment. Other embodiments and configurations may also be provided.

As shown in FIG. 6, the location tracking unit 121 may include a location detector 610 and a variation amount calculator 620. The location detector 610 may receive an image frame of a photographed viewer, and the location detector 610 may detect (or determine) a location of the viewer based on the received image frame. The location detector 610 may recognize (or determine) a face area in order to detect the location of the viewer. The location detector 610 may recognize (or determine) the face area based on an algorithm using face symmetry, an algorithm using a hair color or face color and/or an algorithm using a face line. The location detector 610 may compute skin color information from the image frame 310, and the location detector 610 may recognize (or determine) the face area.

The location detector 610 may recognize (or determine) a viewing distance based on the detected location of the viewer. For example, the location detector 610 may compute the viewing distance based on an image ratio and an image location of the viewer in the image frame. Alternatively, the location detector 610 may acquire (or obtain) a depth value of the face area from a depth image, and the location detector 610 may compute the viewing distance based on the acquired depth value.

The location detector 610 may compute the viewing distance by comparing a reference image frame with a current image frame. For example, the location detector 610 may compare a ratio of the viewer from the reference image frame with a ratio of the viewer from the current image frame, such that the location detector 610 may compute the viewing distance based on the difference between the image ratios. That is, when the image ratios are identical, the viewing distance of the reference image frame may be recognized (or determined) as the viewing distance of the current image frame. Alternatively, the location detector 610 may compare the viewer image size of the reference image frame with the viewer image size of the current image frame in order to compute the viewing distance. The viewer image may be a face area or a skin area in an image frame.

The location detector 610 may compare a former image frame with a current image frame in order to compute the viewing distance. The comparison may use a comparison method identical to the comparison method with respect to the reference image frame.

The variation amount calculator 620 may calculate the stereoscopic image variation amount based on the detected viewer location (or determined viewer location), and the variation amount calculator 620 may output the calculated stereoscopic image variation amount. When the viewer is moving in parallel to the display panel, the variation amount calculator 620 may calculate the movement amount 'h' of eye locations on the display panel based on the following 'EQUATION 5':

$$h = H*d/D \qquad \text{[EQUATION 5]}$$

In EQUATION 5, 'H' is a head movement amount of the viewer, 'D' is the viewing distance which is a distance to the viewer's eyes from a stereoscopic image filter and 'd' is a distance between the display panel and the stereoscopic image filter.

When the viewer is moving in parallel to the display panel, the variation amount calculator 620 may calculate the pixel movement amount 'P' which is an example of the stereoscopic image variation amount based on the following 'EQUATION 6':

$$P = \text{Mod}(h, Q) \qquad \text{[EQUATION 6]}$$

In EQUATION 6, 'Q' is a stereoscopic image pixel period.

Figure 7:
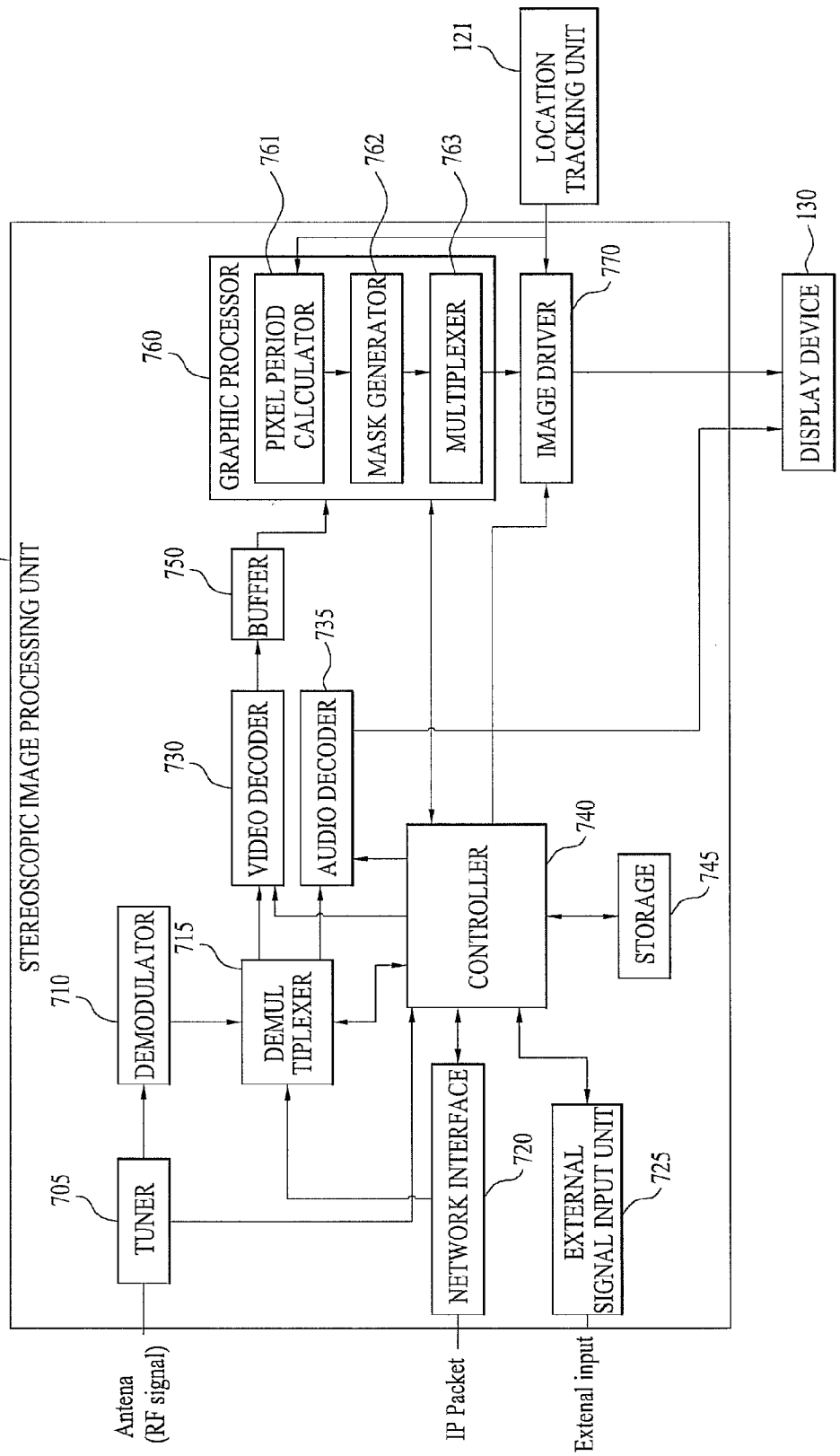
FIG. 7 is a block diagram of a stereoscopic image processing device according to an exemplary embodiment.

FIG. 7 is a block diagram of a stereoscopic image processing device according to an exemplary embodiment. Other embodiments and configurations may also be provided.

FIG. 7 shows that the stereoscopic image processing unit 122 may include a tuner 705, a demodulator 710, a demultiplexer 715, a network interface 720, an external signal input unit 725, a video decoder 730, an audio decoder 735, a controller 740, a storage 745, a buffer 750, a graphic processor 760 and an image driver 770. Other components may also be provided.

The tuner 705 may select one of Radio Frequency (RF) broadcasting signals received via an antenna, corresponding to a channel selected by a user, and the tuner 705 may convert the selected RF broadcasting signal into a middle frequency signal or a baseband video or audio signal. The tuner 705 may receive a RF broadcasting with a single carrier according to Advanced Television System Committee (ATSC) or a RF broadcasting signal with a plurality of carriers according to Digital Video Broadcasting (DVB).

According to one embodiment, the stereoscopic image processing unit 122 may include at least two tuners. When at least two tuners are included, a second tuner may select one of the RF broadcasting signals received via the antenna, which corresponds to a channel selected by the user, such as a first tuner, and the second tuner may convert the selected RF broadcasting signal into a middle frequency signal or a baseband video or audio signal.

The second tuner may sequentially select RF broadcasting signals of the received RF signals, which correspond to all of the stored broadcasting channels via a channel memory function, and the second tuner may convert them into the middle frequency signals or baseband video/audio signals. The second tuner may periodically perform conversion of all the broadcasting channels. Accordingly, the stereoscopic image processing unit 122 may provide images of broadcasting signals converted by the first tuner and may provide a thumbnail type of images converted by the second tuner simultaneously. In this example, the first tuner may convert a main RF broadcasting signal selected by the user into a middle frequency signal or a baseband video/audio signal, and the second tuner may sequentially and periodically select the other RF broadcasting signals (except the main RF broadcasting signal) and may convert them into middle frequency signals or baseband video/audio signals.

The demodulator 120 may receive a digital IF signal (DIF) converted by the tuner 110, and the demodulator 120 may perform demodulation of the DIF. For example, when the digital IF signal outputted from the tuner 110 is an ATSC system, the demodulator 120 may perform 8-VBS (8-Vestigial Side Band) demodulation. Alternatively, when the digital IF signal outputted from the tuner 110 is a DVB system, the demodulator 120 may perform Coded Orthogonal Frequency Division Modulation (COFDMA).

The demodulator 120 may perform channel decoding. The demodulator 120 may include a trellis decoder, a de-interleaver and a reed Solomon decoder to perform trellis decoding, de-interleaving and reed Solomon decoding.

After performing the demodulation and channel decoding, the demodulator 120 may output a stream signal (TS). The stream signal may be a signal multiplexed of video, audio and data signals. For example, the stream signal may be MPEG-2 Transport Stream (Ts) multiplexed of MPEG-2 format video signal, Dolby AC-3 format audio signal. More specifically, MPEG-2 Ts may include a 4 byte header and a 184 bite payload.

The demultiplexer 715 may receive a stream signal from the demodulator 710, the network interface 720 and the external signal input unit 725. The demultiplexer 715 may demultiplex the received stream signal into a video signal, an audio signal and/or a data signal, and may output the demultiplexed signals to the video decoder 730, the audio decoder 735 and/or the controller 740, respectively.

The video decoder 730 may receive the video signal from the demultiplexer 715, and the video decoder 730 may reconstruct the received video signal to store in the buffer 750. The video signal may include a stereoscopic image signal.

The audio decoder 735 may receive and reconstruct the audio signal from the demultiplexer 715, and the audio decoder 735 may output the reconstructed audio signal to the display device 130.

The network interface 720 may receive packets from the network and may transmit the received packets to the network. That is, the network interface 720 may receive IP packets configured to transport broadcasting data from the service providing server via the network. The broadcasting data may include contents, an update message configured to notify contents updating, metadata, service information, software codes and A/V data. The service information may include service information on a real-time broadcasting service and service information on an Internet service. The Internet service may be a service included via the internet, such as, a Content's on Demand (COD) service, a YouTube service, an information service for weather, news, community information and search, an entertainment service for a game and karaoke, and/or a communication service for TV mail and TV Short Message Service (SMS). As a result, the digital broadcasting receiver may include a network TV, a web TV and/or a broadband TV. The broadcasting service may include an internet service as well as a broadcasting service included via terrestrial, satellite and cable.

When the IP packets include a stream signal, the network interface 720 may extract the stream signal from the IP packets and the network interface 720 may output the extracted stream signal to the demultiplexer 715.

The external signal input unit 725 may provide an interface that can connect an external device with the stereoscopic image processing unit 122. The external device may be a Digital Versatile Disk (DVD), a Bluray, a game unit, a camcoder, a computer (notebook) and/or various kinds of video or audio output units. The stereoscopic image processing unit 122 may control video signals and audio signals received from the external signal receiver 135 to be displayed, and may store or use a data signal.

The controller 740 may implement commands and perform an operation related to the stereoscopic image processing unit 122. For example, the controller 740 may control input and output and receiving and processing of data between components of the stereoscopic image processing unit 122, using a command searched in the storage 745. The controller 740 may be represented on a single chip, a plurality of chips or a plurality of electric parts. For example, a variety of architectures including an exclusive or embedded processor, a single purpose processor, a controller, an ASIC and/or the like may be useable with respect to the controller 740.

The controller 740 may implement a computer code together with an operating system and the controller 740 may perform generation and usage of data. The operating system may be well-known in the art and a full description of the operating system may be omitted. For example, the operating system may be Window series OS, Uni, Linux, Palm OS, DOS, Android and Macintosh and/or the like. The operating system, another computer code and data may exist in the storage connected with the controller 740.

The storage 745 may provide storage for program codes and data used by the transparent display device 100. For example, the storage 180 may be a ROM (Read only Memory), a RAM (Random Access Memory), and/or a harddisc drive. The program codes and data may exist in a separable storage medium or they may be loaded or installed on the stereoscopic image processing unit 122. The separable storage medium may include a CD-ROM, a PC-CARD, a memory card, a floppy disc, a magnetic tape and/or a network component.

The graphic processor 760 may control the display device 130 to display the image data stored in the buffer 750. The graphic processor 760 may include a pixel period calculator 761, a mask generator 762 and/or a multiplexer 763.

The pixel period calculator 761 may calculate or determine the stereoscopic image pixel period 'Q' based on the viewing distance received from the location tracking unit 121 from 'EQUATION 1'.

The mask generator 762 may generate a view mask for the stereoscopic image based on the stereoscopic image pixel period calculated by the pixel period calculator 761. The mask generator 762 may determine the view number 'Vi' including a decimal point of each sub-pixel based on the stereoscopic image pixel period 'Q' from 'EQUATION 2'. After that, the mask generator 762 may generate the view mask corresponding to the view number for each sub-pixel from 'EQUATION 3'.

The multiplexer 763 may determine a final color of a pixel based on the view mask generated by the mask generator 762. The multiplexer 763 may determine the final color 'MCi' based on 'EQUATION 4'.

The image driver 770 may determine a sub-pixel that may display the final color MCi based on the stereoscopic image variation amount calculated by the location tracking unit 121, and the image driver 770 may output a control signal to the display device 130 to enable the determined sub-pixel to display the final MCi. The final color MCi may be displayed on a sub-pixel positioned in a predetermined location that is a location of an 'i' sub-pixel that is moved based on the amount of the stereoscopic image variation.

Embodiments may be embodied as code readable by a computer in a recording medium readable by a computer. The recording medium may include all kinds of recording devices capable of storing data readable by a computer device. For example, the recording medium readable by the computer may be a ROM, a RAM, a CD-ROM, a magnetic tape, a floppy disk, and/or an optical data storing device, and the recording medium may be embodied as a carrier wave type (for example, transmission via Internet). The recording medium readable by the computer may be distributed in a computer unit connected via a network and a code readable by the computer in distribution may be stored in the recording medium to be implemented.

Embodiments may be directed to a stereoscopic image display system, a stereoscopic display device and/or a method for displaying a stereoscopic image that substantially obviates one or more problems due to limitations and disadvantages of disadvantageous arrangements.

Embodiments may provide a stereoscopic image display system, a stereoscopic image display device and/or a method for displaying a stereoscopic image, which are able to extend a viewing distance.

Embodiments may provide a stereoscopic image display system, a stereoscopic image display device and/or a method for displaying a stereoscopic image, which are able to display proper stereoscopic images based on a viewing distance A method may be provided for displaying a stereoscopic image. The method may include recognizing (or determining) a viewing distance, calculating a stereoscopic image pixel period based on the recognized viewing distance, determining a color of at least one of pixels and sub-pixels that display a stereoscopic image based on the calculated stereoscopic image pixel period, and displaying the stereoscopic image based on the determined color. The viewing distance may be recognized via a photographed image frame.

The color determining may include generating a view mask for the stereoscopic image by using the calculated stereoscopic pixel period, and determining the color by using the generated view mask.

Generating the view mask may include calculating a view number of at least one of pixels and sub-pixels based on the calculated stereoscopic image pixel period, and generating the view mask based on the calculated view number.

The view number may be calculated based on the calculated stereoscopic image pixel period, an initial stereoscopic image pixel period and/or an initial view number.

A scope of the view number may be within a predetermined scope of the number of views.

The method may further include photographing an image of a viewer, detecting (or determining) a location of the viewer by using an image frame included in the photographed image, and calculating the amount of stereoscopic image variation based on the detected location of the viewer. The displaying may adjust a location at which the determined color will be displayed based on the amount of the stereoscopic image variation, in order to display the stereoscopic image.

The stereoscopic image may be a multiview image.

The method may further include receiving a RF broadcasting signal (comprising the stereoscopic image), demodulating the received RF broadcasting signal, demultiplexing the demodulated RF broadcasting signal into a stereoscopic image signal, an audio signal and a data signal, and decoding the demultiplexed stereoscopic image signal.

The method may further include receiving Internet Protocol (IP) comprising the stereoscopic image, and decoding the stereoscopic image.

A stereoscopic image display device may include a location tracking unit to recognize (or determine) a viewing distance, and an image processing unit to calculate a stereoscopic image pixel period based on the recognized viewing distance, to determine a color of at least one of pixels and sub-pixels that display the stereoscopic image based on the calculated stereoscopic image pixel period, and to control the stereoscopic image to be displayed based on the determined color. The location tracking unit may recognize (or determine) the viewing distance by using a photographed image frame.

The image processing unit may include a pixel period calculator to calculate (or determine) a stereoscopic image pixel period based on the recognized viewing distance, a mask generator to generate a view mask for the stereoscopic image based on the calculated stereoscopic image pixel period, and a multiplexer to determine the color by using the generated view mask.

The mask generator may calculate a view number of at least one of pixels and sub-pixels by using the calculated stereoscopic image pixel period and the mask generator may generate the view mask based on the calculated view number.

The view number may be calculated based on the calculated stereoscopic image pixel period, an initial stereoscopic image pixel period and/or an initial view number.

A scope of the view number may be within a predetermined scope of the number of views.

The location tracking unit may include a location detector to detect (or determine) a location of the viewer by using an image frame included in a photographed image of the viewer, and a variation amount calculator to calculate the amount of stereoscopic image variation based on the detected location of the viewer.

The image processing unit may adjust a location that will display the determined color based on the amount of the stereoscopic image variation.

The stereoscopic image may be a multiview image.

The stereoscopic image display device may further include a tuner to receive a RF broadcasting signal (comprising the stereoscopic image), a demodulator to demodulate the received RF broadcasting signal, a demultiplexer to demultiplex the demodulated RF broadcasting signal into a stereoscopic image signal, an audio signal and a data signal, and a decoder to decode the demultiplexed stereoscopic image signal.

The stereoscopic image display device may further include a network interface to receive IP (Internet Protocol) packets that include the stereoscopic image, and a decoder configured to decode the stereoscopic image.

A stereoscopic image display system may include a camera to photograph an image of a viewer, a location tracking unit to recognize (or determine) a viewing distance by using an image frame included in the photographed image, an image processing unit to calculate a stereoscopic image pixel period based on the recognized viewing distance, to determine a color of at least one of pixels and sub-pixels that display the stereoscopic image based on the calculated stereoscopic image pixel period, and to control the stereoscopic image to be displayed based on the determined color, and a display device to display the stereoscopic image.

In the stereoscopic image display device and the method for displaying the stereoscopic image, a distance between the display panel and the viewer is recognized (or determined) and the pixel period is adjusted based on the recognized distance. As a result, the viewer may view the stereoscopic image without any distance limitations.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying a perceived three-dimensional (3D) image, the method comprising:
   determining a viewing distance from a screen to a viewer;
   calculating an image pixel period based on the determined viewing distance without any change of a pattern period of a stereoscopic image filter;
   determining a color of at least one of pixels and sub-pixels for displaying a perceived 3D image based on the calculated image pixel period; and
   displaying the image based on the determined color,
   wherein the image pixel period is a period of pixel data of a part of a perceived 3D image that can be seen by one eye of the viewer at the determined viewing distance,
   the image pixel period is calculated based on the determined viewing distance, a distance between the display panel and the stereoscopic image filter, and the pattern period of the stereoscopic image filter, when the determined viewing distance is greater than a predetermined viewing distance, the image pixel period of the image is calculated to be less than a predetermined image pixel period corresponding to the predetermined viewing distance, and when the determined viewing distance is less than a predetermined viewing distance, the image pixel period of the image is calculated to be greater than the predetermined image pixel period corresponding to the predetermined viewing distance.

2. The method of claim 1, wherein determining the viewing distance includes determining the viewing distance by using a photographed image frame.

3. The method of claim 1, wherein the determining the color comprises:
determining a view mask for the image using the calculated image pixel period; and
determining the color based on the determined view mask.

4. The method of claim 3, wherein determining the view mask comprises:
calculating a view number of at least one of pixels and sub-pixels based on the calculated image pixel period; and
determining the view mask based on the calculated view number.

5. The method of claim 4, wherein calculating the view number includes calculating the view number based on the calculated image pixel period, an initial image pixel period and an initial view number.

6. The method of claim 4, wherein a scope of the view number is within a predetermined scope of the number of views.

7. The method of claim 1, further comprising:
photographing an image of a viewer;
determining a location of the viewer by using an image frame of the photographed image; and
calculating the amount of image variation based on the determined location of the viewer,
wherein displaying the image comprises adjusting a location at which the determined color will be displayed based on the calculated amount of the image variation.

8. The method of claim 1, wherein the image is a multiview image.

9. The method of claim 1, further comprising:
receiving a radio frequency (RF) broadcasting signal that includes the image;
demodulating the received RF broadcasting signal;
demultiplexing the demodulated RF broadcasting signal into an image signal, an audio signal and a data signal; and
decoding the demultiplexed image signal.

10. The method of claim 1, further comprising:
receiving an Internet Protocol (IP) packet that includes the image; and
decoding the image.

11. An image display device to display a perceived three-dimensional (3D) image, the image display device comprising:
a location tracking unit to determine a viewing distance from a screen to a viewer; and
an image processing unit to calculate an image pixel period based on the determined viewing distance without any change of a pattern period of a stereoscopic image filter, to determine a color of at least one of pixels and sub-pixels for displaying a perceived 3D image based on the calculated image pixel period, and to control the image to be displayed based on the determined color, wherein
the image pixel period is a period of pixel data of a part of a perceived 3D image that can be seen by one eye of the viewer at the determined viewing distance,
the image pixel period is calculated based on the determined viewing distance, a distance between the display panel and the stereoscopic image filter, and the pattern period of the stereoscopic image filter,
when the determined viewing distance is greater than a predetermined viewing distance, the image processing unit is configured to calculate the image pixel period of the image to be less than a predetermined image pixel period corresponding to the predetermined viewing distance, and
when the determined viewing distance is less than a predetermined viewing distance, the image processing unit is configured to calculate the image pixel period of the image to be greater than the predetermined image pixel period corresponding to the predetermined viewing distance.

12. The image display device of claim 11, further comprising a display device to display the image.

13. The image display device of claim 11, wherein the location tracking unit determines the viewing distance based on a photographed image frame.

14. The image display device of claim 11, wherein the image processing unit comprises:
an image pixel period calculator to calculate an image pixel period of the image based on the determined viewing distance;
a mask generator to determine a view mask for the image based on the calculated image pixel period; and
a multiplexer to determine the color based on the determined view mask.

15. The image display device of claim 14, wherein the mask generator calculates a view number of at least one of pixels and sub-pixels based on the calculated image pixel period, and the mask generator determines the view mask based on the calculated view number.

16. The image display device of claim 15, wherein the view number is calculated based on the calculated image pixel period, an initial image pixel period and an initial view number.

17. The image display device of claim 15, wherein a scope of the view number is within a predetermined scope of the number of views.

18. The image display device of claim 11, wherein the location tracking unit comprises:
a location detector to determine a location of the viewer based on an image frame included in a photographed image of the viewer; and
a variation amount calculator to calculate an amount of image variation based on the determined location of the viewer.

19. The image display device of claim 18, wherein the image processing unit adjusts a location to display the determined color based on the amount of the image variation.

20. The image display device of claim 11, wherein the image is a multiview image.

21. The image display device of claim 11, further comprising a camera to photograph an image of a viewer.

* * * * *